United States Patent [19]
Kobayashi et al.

[11] Patent Number: 5,581,406
[45] Date of Patent: Dec. 3, 1996

[54] ANTI-GLARE REARVIEW MIRROR SYSTEM

[75] Inventors: Masaki Kobayashi; Michiaki Hattori, both of Fujieda, Japan

[73] Assignee: Murakami Kaimeido Co., Ltd., Shizuoka, Japan

[21] Appl. No.: 208,613

[22] Filed: Mar. 9, 1994

[30] Foreign Application Priority Data

Mar. 9, 1993 [JP] Japan ................. 5-015587 U

[51] Int. Cl.⁶ .................. G02B 5/08; G02F 1/153
[52] U.S. Cl. ............ 359/604; 359/267; 359/273; 359/603
[58] Field of Search .......... 359/601–604, 359/606, 613–615, 38, 265, 267; 250/200, 201.1, 205–206, 210, 214 AL, 214 R, 214 B

[56] References Cited

U.S. PATENT DOCUMENTS

| | | | |
|---|---|---|---|
| 4,281,898 | 8/1981 | Ochiai et al. | 359/606 |
| 4,669,825 | 6/1987 | Itoh et al. | 359/38 |
| 4,896,030 | 1/1990 | Miyaji | 250/206 |
| 5,148,014 | 9/1992 | Lynam et al. | 359/602 |
| 5,193,029 | 3/1993 | Schofield et al. | 359/604 |
| 5,204,778 | 4/1993 | Bechtel | 359/604 |
| 5,469,296 | 11/1995 | Ohno et al. | 359/603 |

FOREIGN PATENT DOCUMENTS

123836  8/1989  Japan.

Primary Examiner—Thong Nguyen
Attorney, Agent, or Firm—Michael J. Striker

[57] ABSTRACT

The mirror system has devices for adjusting the reflectivities of the interior and exterior rearview mirrors to different values to correct the driver's unbalanced rearview visibility. These devices include, for instance, a liquid-phase ECD used in the interior rearview mirror and a solid-state ECD used in the exterior rearview mirror so that appropriate reflectivities of the two mirrors can be obtained, even if they experience the same operation conditions. When the same-type ECD is used for both interior and exterior rearview mirrors, the drive voltage for the exterior rearview mirror is made lower than that for interior rearview mirror to make the latter's reflectivity smaller than the former's. For this purpose, transforming circuits are provided as well as terminal voltage sensing and controlling circuits.

5 Claims, 8 Drawing Sheets

| | refractance | | coloring | | | bleaching | |
|---|---|---|---|---|---|---|---|
| | coloring (%) | bleaching (%) | driving voltage (V) | coloring velocity (sec) | driving voltage (V) | bleaching velocity (sec) |
| liquid phase ECD | <10 | 70~80 | 0.8~1.3 | 3~5 | short | 10~15 |
| solid state ECD | <10 | 70~80 | 1.0~2.0 | 1~3 | -1.0~-2.0 | 2~7 |

FIG.8

ANTI-GLARE REARVIEW MIRROR SYSTEM

BACKGROUND OF THE INVENTION

The present invention relates to an automobile mirror system in which the automobile interior and exterior rearview mirrors differ in reflectivity, particularly to an anti-glare mirror system in which the interior rearview mirror has a lower reflectivity than the exterior rearview mirror.

During night driving, drivers sometimes experience glare from the interior rearview mirror (hereinafter referred to as "IM") and the exterior or outside rearview mirror ("OM") of their cars due to reflected light from the following cars. To prevent this, anti-glare mirror systems have been invented.

These anti-glare mirror systems use an electrochromic device (hereinafter referred to as "ECD"), a liquid crystal device ("LCD"), or other means.

The ECD has the property of changing between a colored and a bleached state by reversible reaction in response to a change in the polarity of the current applied to it. Utilizing this property, the ECD is put in the colored state when it is desired to reduce the mirror reflectivity and in the bleached state when it is desired to increase the reflectivity.

The LCD has the property of changing the orientation of its liquid crystal molecules according to the electric field applied to it. When light enters a liquid crystal with this sort of molecular orientation, the light is polarized and makes complex refraction. Accordingly, the reflectivity can be controlled by controlling the orientation of the liquid crystal.

But the LCD is more difficult to handle and more expensive than the ECD, so that the ECD is more frequently used for the anti-glare mirror systems.

Both liquid-phase ECD and solid-state ECD made from different materials exist. While it is easier to achieve a low reflectivity and economical anti-glare mirror system with a liquid-phase ECD, it has the disadvantages that it has a slower color change reaction than a solid-state ECD, it is chemically unsuitable, it is hard to be apply to curved mirrors.

The basic structure of the liquid-phase ECD consists of a liquid-phase EC layer sandwiched between two sheets of transparent substrates. The opposite side surface of one of the substrates contacting the liquid-phase EC layer is provided with an anti-reflectance coating. The reason that the anti-reflectance coating and the liquid-phase EC layer are installed via the transparent substrate is that the anti-reflectance coating, if it comes into contact with the liquid-phase EC layer, reacts with the acid contained in the layer.

The problem is that the reflection of light in the rearview mirror field can therefore occur by the anti-reflectance coating and the transparent substrate provided with this coating, producing multiple images in the rearview mirror field which can impair the driver's visibility. This impairment of visibility by the occurrence of multiple images becomes remarkable if the light incidence angle in the rearview mirror field differs significantly from its reflection angle, so it is difficult to apply the liquid-phase ECD to the OM.

Meanwhile, if the IM is installed at a location closer to the driver's seat, the IM produces more glare than the OM, so that if both the IM and OM have the same reflectivity, the visibility in the rearview mirror field becomes unbalanced.

In the OM and IM having an ECD with the same members and used under the same operation conditions, the attempt to prevent the IM from producing glare could reduce the reflectivity of the OM, impairing the visibility in the rearview mirror field, while prevention of glare from the OM makes prevention of glare from the IM insufficient. Thus the ECD has conventionally been only used for the IM which has a greater glare than the OM to obtain better visibility in the rearview mirror field.

However the problem with this latter method is that, even if the IM glare can be prevented, the OM glare cannot be eliminated. To solve this problem, the U.M. Journal No. 123836/1989 discloses a method which varies the operating conditions between the IM and OM having the ECD with the same members.

More concretely, the apparatus is structured so that the IM ECD can be colored prior to the OM ECD to activate the anti-glare feature of the mirror system, and the IM ECD can be bleached prior to the OM ECD to make the mirror system turn off the anti-glare feature.

However in this case, though the timing of the coloring differs from that of the bleaching, the IM and OM show the same reflectivity when the ECD has reached saturation conditions after a predetermined time after the start of the coloring or the bleaching, making the driver's visibility unbalanced between the IM and OM.

SUMMARY OF THE INVENTION

The object of this invention is then to provide an anti-glare mirror system in which the OM and IM differ from each other in reflectivity when the anti-glare feature is activated. For this purpose, the mirror system according to this invention is provided with electro-optical devices to vary the reflectivities of the IM and OM, and electrical drive circuit means for driving the electro-optical device to make the reflectivities of the IM and OM differ, thus adjusting the variation of driver's visibility.

For the above purpose, the drive circuit means is provided with sensing circuit means which senses the levels of the ambient light and backward light and compares them with standard values to determine whether a change in the IM and OM reflectivities is warranted by these light levels, a day/night switching gate circuit means which determines if a time period during which the light levels indicate a change in the reflectivities exceeds a predetermined time interval thus indicating that the light levels are not temporary, and an electrical drive circuit means which drives the electro-optical devices according to signals received from the day/night switching gate circuit means.

The electro-optical device used in the IM can be a liquid-phase electrochromic device, the electro-optical device used in the OM can be a solid-state electrochromic device, and the drive circuit means can apply the same drive voltage value to both to make the IM reflectivity smaller than the OM reflectivity.

The drive circuit means can also be provided with a transforming circuit for changing the drive voltages supplied to the IM and OM to adjust the drive voltage value provided to the IM to a value that is greater than the drive voltage value supplied to the OM so that the IM reflectivity is smaller than the OM reflectivity.

Further, the drive circuit means is provided with timer circuit means which controls the timing of the application of voltages to the IM and OM so that the start of the drive voltage supplied to the IM is earlier than the start of the drive voltage supplied to the OM, and so the termination of the drive voltage supplied to the IM is later than the termination of the drive voltage supplied to the OM.

Still further, the drive circuit means is provided with sensing/controlling circuit means for terminal voltages of the IM and OM which detects the terminal voltages of the IM and OM and which compares the terminal voltages with standard values and controls the voltages applied to the IM and OM so that a fixed drive voltage value can be applied to the IM and the OM.

An electrochromic device, a liquid crystal device and two kinds of electro-optical devices selected from PLZT can be used as the electro-optical devices in the invention.

DESCRIPTION OF THE PREFERRED EMBODIMENTS

Figure 1:
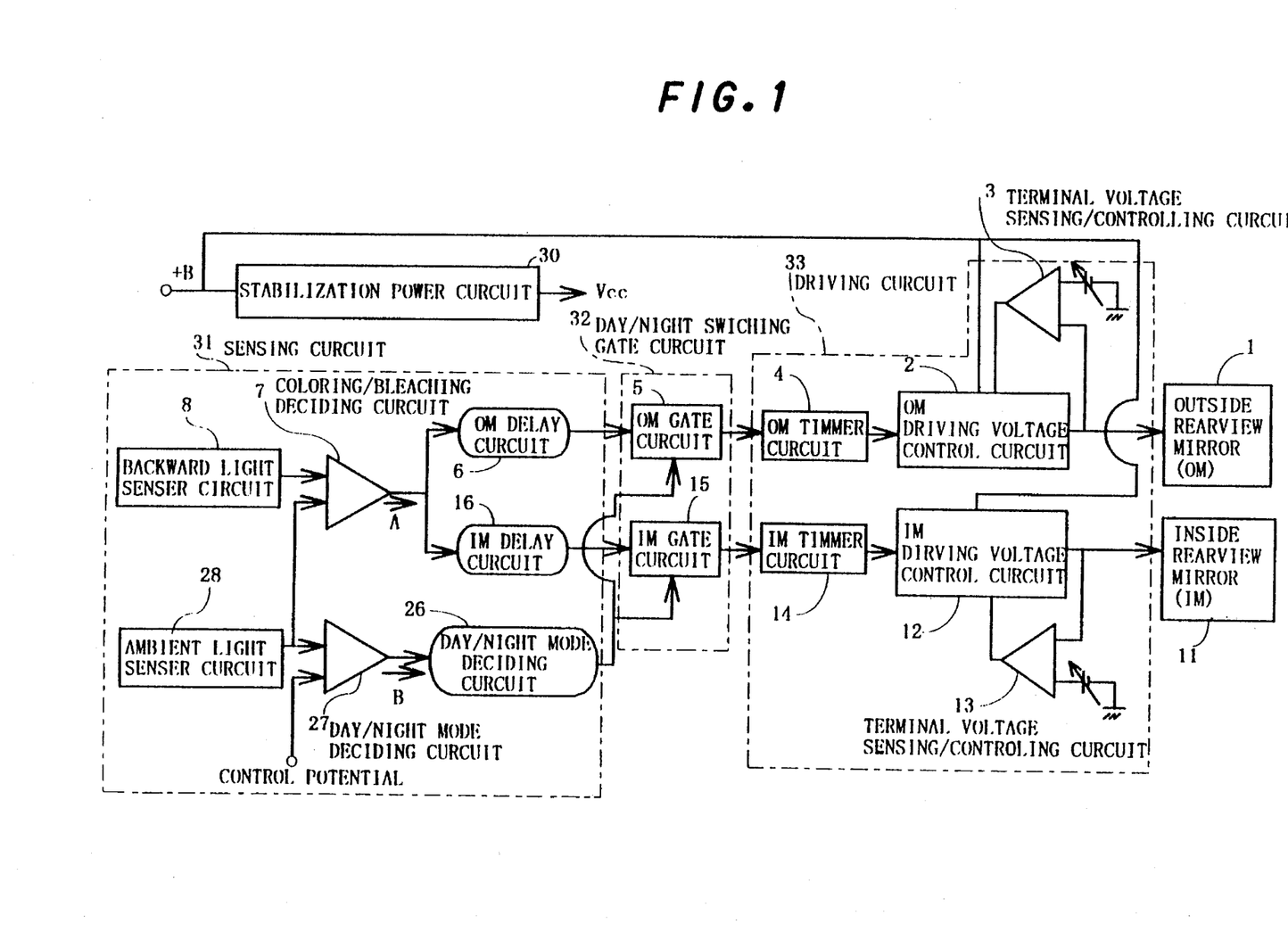
FIG. 1 is a block diagram of the anti-glare mirror system according to a first embodiment of the invention.

The first embodiment of the anti-glare mirror system according to the invention is shown in a block diagram in FIG. 1. The anti-glare mirror system shown in FIG. 1 uses the same type of ECD for IM and OM and produces and applies individual drive voltages to each of them. The anti-glare mirror system comprises an electrical drive circuit means, the OM and the IM.

The drive circuit means comprises the OM 1, the IM 11, a stabilized power supply circuit 30, a sensing circuit 31, a day/night switching gate circuit 32 and a driver circuit 33.

The sensing circuit 31 consists of a backward light sensor circuit 8, an ambient light sensor circuit 28, a coloring/bleaching deciding circuit 7, a day/night mode deciding circuit 27, a delay circuit 6 for delaying the start of the coloring or bleaching of the OM (hereinafter referred to as "OM delay circuit"), a delay circuit 16 for delaying the start of the coloring or bleaching of the IM ("IM delay circuit") and a day/night mode deciding delay circuit 26.

The day/night switching gate circuit 32 consists of a gate circuit 5 for controlling the operation of the OM ("OM gate circuit") and a gate circuit 15 for controlling the operation of the IM ("IM gate circuit").

The driver circuit 33 consists of a timer circuit 4 for driving the OM ("OM drive timer circuit"), a timer circuit 14 for driving IM ("IM drive timer circuit"), a drive voltage controlling circuit 2 for controlling the driving voltage of the OM ("OM drive voltage control circuit"), a drive voltage controlling circuit 12 for controlling the drive voltage of IM ("IM drive voltage control circuit") and terminal voltage sensing and controlling circuits 3 and 13.

The sensing circuit 31 detects the intensity or level of the backward light with the backward light sensor circuit 8, and the level or intensity of the ambient light around the car with the ambient light sensor circuit 28. The signal from the ambient light sensor circuit 28 is input to the day/night mode deciding circuit 27, which compares this signal with the standard value to discriminate "the day mode" from "the night mode". The result of this discrimination or decision is the day/night mode signal B which is input to the day/night mode deciding delay circuit 26.

When the car passes under a street light, it momentarily brightens the surroundings of the car. In this case, if the anti-glare mirror system were to be so sensitive that it reacts to the momentary change in ambient brightness, it could impair the safety of car operation. To prevent this, the day/night mode deciding delay circuit 26 is so arranged that the day/night mode signal B is only output when the signal from the day/night mode deciding circuit 27 persists for a fixed time period.

That is, when the day/night mode deciding circuit 27 determines that the "the day mode" or "the night mode" is present, unless this decision persists for more than a fixed predetermined time interval, the output from the day/night mode deciding delay circuit 26 does not change. Accordingly, even if the car passes under a street light and the level of the ambient light temporarily increases, the OM 1 and IM 11 do not change their reflectivity.

Meanwhile, the signal from the backward light sensor circuit 8 and the signal from the ambient light sensor circuit 28 are input to the coloring/bleaching state deciding circuit 7, where the levels of these signals are compared with each other. By this comparison, whether the OM 1 and IM 11 should take "the colored state (anti-glare condition)" or "bleached state (inactive condition)" is decided, and the coloring/bleaching state signal A is output accordingly.

The system responds to the changes in the backward light in real time and the decisions are made in real time. Let us imagine that the following car flashes its headlights. In this case, the signal from the coloring/bleaching state deciding circuit 7 changes synchronously with the headlight flashing. So, if this signal is used "as is" as the control signal for OM 1 and IM 11, their reflectivities will change synchronously with the headlight flashing, which can impair the safety of car operation.

Then the OM and IM delay circuits 6 and 16 which are connected with the coloring/bleaching state deciding circuit 7 are so arranged as to output the coloring or bleaching signal only when the signal from the coloring/bleaching state deciding circuit 7 persists for more than a fixed time interval or period.

Generally speaking, the mirror glare differs in nature in daytime and in nighttime. The OM 1 and IM 11 must therefore be made "the colored state" or "the bleached state" depending on "the daytime mode" or "the nighttime mode" of the car. This decision is done by the coloring/bleaching switching gate circuit 32 which makes a logical decision regarding the coloring or bleaching signal from the OM or the IM delay circuit 6 or 16, and the signal from the day/night mode deciding delay circuit 26.

The result of the logical judgment of the coloring/bleaching switching gate circuit 32 is input to the OM and IM drive timer circuits 4 and 14, both of which output the control signal to the IM and OM driving voltage control circuits 12 and 2 respectively to drive the OM 1 and the IM 11 for a fixed time period.

As mentioned above, the mirror glare caused by the light from the headlight of the following car and other sources is most significant at the IM 11. Also, the ECD darkens in color in proportion to the drive voltage value. Accordingly, if the IM 11 and OM 1 are operated under the same conditions, the driver's ability to see in the rearview mirror field is different for the IM and the OM. Then, the color depth of both the OM 1 and the IM 11 is adjusted by changing the drive voltage of one of the IM 11 and the OM 1 with respect to the other to adjust the difference in the driver's ability to see in the rearview mirror field between the IM and the OM.

For this purpose, terminals voltage sensing and controlling circuits 3 and 13 are provided. The input terminals of these circuit 3 and 13, are input the free-to-set standard voltage and the voltages applied to IM 11 and OM 1. And these circuits 3 and 13 output their signal to the IM and OM drive voltage control circuit 12 and 2, so that these voltages may become equal to one another.

It is therefore possible to set up the IM and OM drive voltage values at different levels, thereby controlling the IM and OM reflectivities independently of each other.

Figure 2:
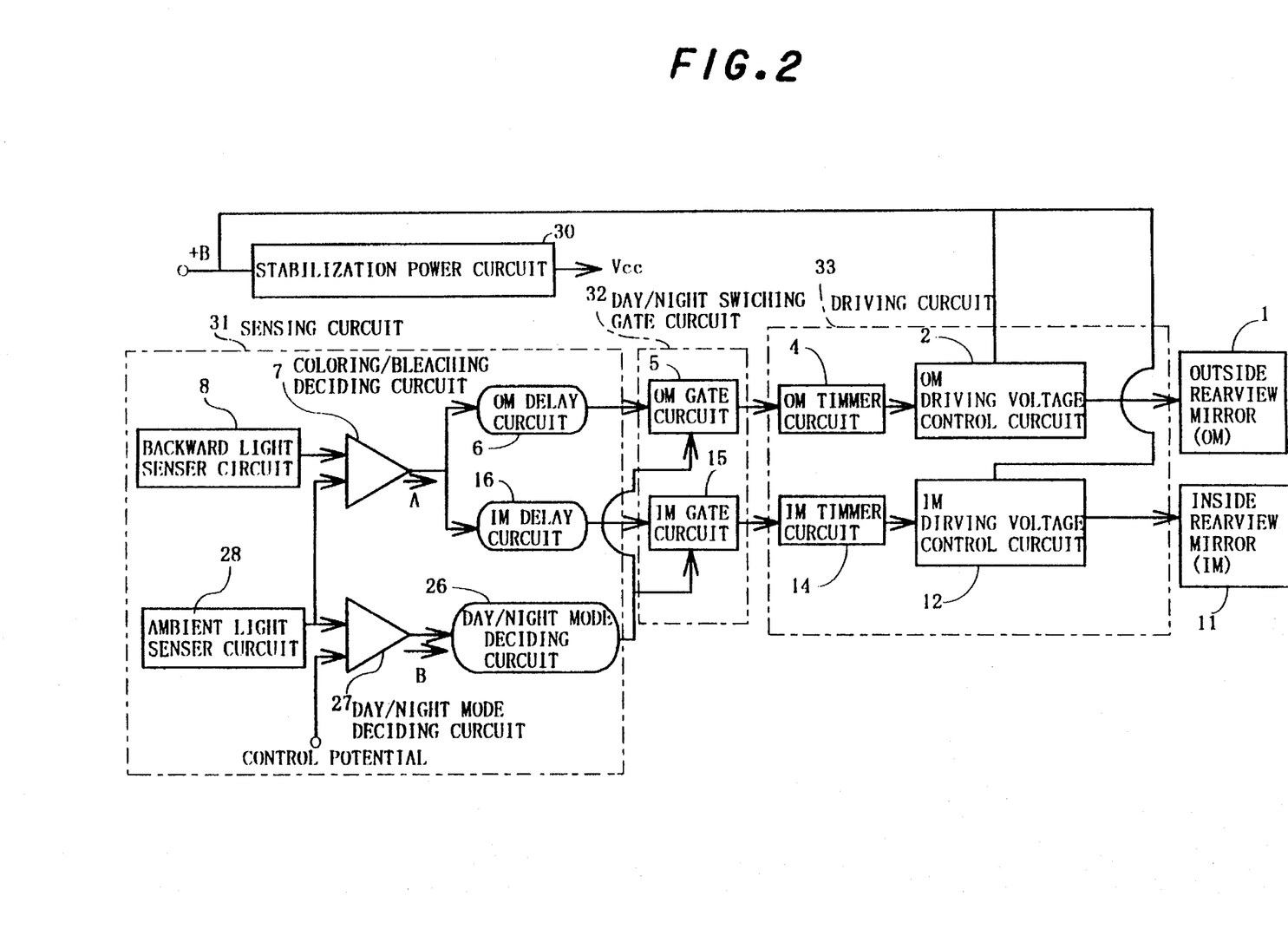
FIG. 2 is a block diagram of the anti-glare mirror system according to a second embodiment of the invention.

The second embodiment of the mirror system according to the invention is now explained hereinbelow referring to the drawings. FIG. 2 shows a block diagram of the second embodiment of the anti-glare mirror system, in which the terminal voltage sensing and controlling circuit 3 and 13 used in the first embodiment is not provided. Therefore, the IM and OM drive voltage control circuits 12 and 2 output the same drive voltage value to ECDs. But in this case, the problem is that IM 11 is darkened more than OM 1 in the colored state, making the driver's visibility in the rearview mirror field unbalanced in the IM and OM.

Meanwhile, as mentioned previously, there are two kinds of ECDs available—the liquid-phase ECD using a liquid-phase EC and the solid-state ECD using a solid-state EC. When operated under the same conditions, the liquid-phase ECD tends to be color more deeply than the solid-state ECD. That is, the liquid-phase ECD maintains the reflectivity lower than the solid-state ECD.

Utilizing this characteristic, the second embodiment uses a liquid-phase ECD in the IM 11 and a solid-state ECD in the OM 1 to improve the unbalanced view in the rearview mirror field of these two devices.

By the way, the same components as in the first embodiment are given the same reference numbers and the explanation of the operation of these components with the same reference numbers is omitted to avoid duplication.

Figure 3A:
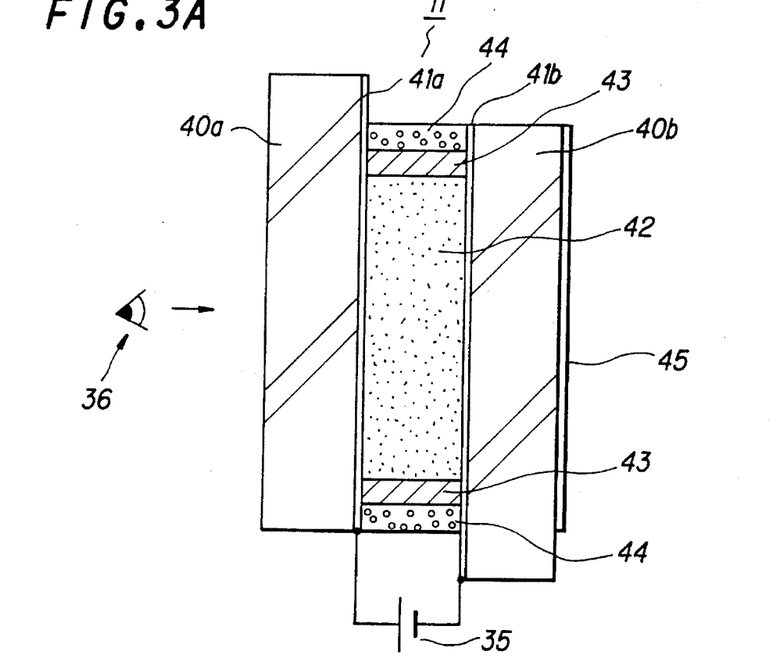
FIG. 3A and FIG. 3B are cross-sectional schematic views of the basic structure of electro-optical devices used in the anti-glare mirror system according to the invention, a liquid-phase ECD being shown in FIG. 3A and a solid-state ECD being shown in FIG. 3B.
Figure 3B:
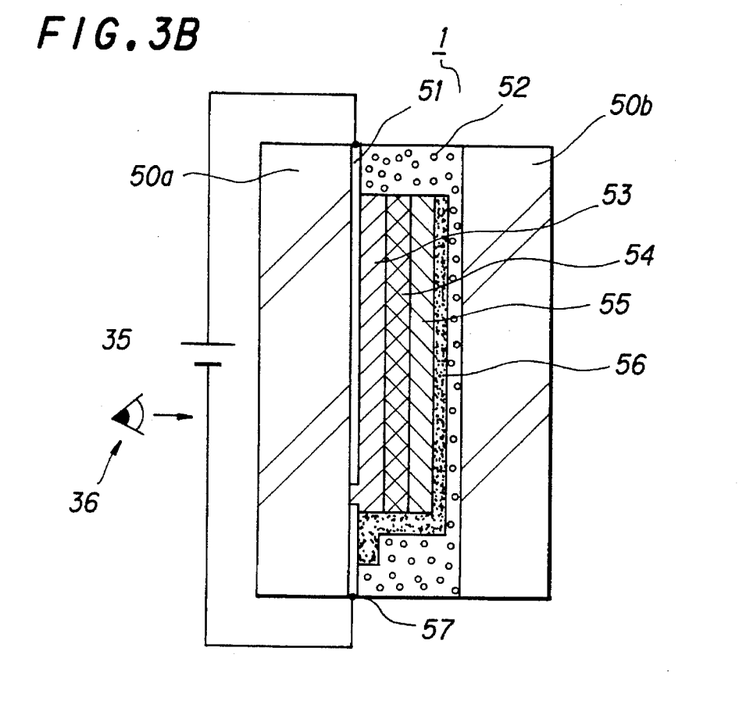

FIGS. 3A and 3B show sectional views of IM 11 and OM 1 to illustrate their principle and structure. FIG. 3A shows the case where the liquid-phase ECD is used in IM 11, and FIG. 3B, the case, where the solid-state ECD is used in OM 1.

As shown in FIG. 3A the IM 11 has a pair of transparent substrates 40a and 40b provided with transparent electrodes 41a and 41b, and the liquid-phase EC 42. The liquid-phase EC 42 is sandwiched between the transparent substrates 40a and 40b, with their sides having the transparent electrodes 41a and 41b facing inwardly, spaced a certain interval from each other with the spacers 43, and fixed with the adhesives 44. Reference number 36 in FIGS. 3A and 3B denotes the operator.

As the liquid-phase EC 42, a reducing EC as shown in formula I below or an oxidizing EC as shown below in formula II (R; alkyl : $C_2H_{2n+1}$, n = 1,2,3...)

can be used by dissolving it in the solvent propylene carbonate using a tetraalkylammonium salt as electrolyte.

Meanwhile, as shown in FIG. 3B, the OM 1 using the solid-state ECD comprises the transparent substrate 50a having the first and second transparent electrodes 51 and 57, and the substrate 50b located opposite to the substrate 50a. The two substrates are fixed together with the adhesive 52.

The first coloring layer EC 53, electrolytic layer 54, the second coloring layer 55 and the second electrode 56 that is used as the reflective film too are laminated between the transparent substrate 50a and its opposing substrate 50b.

The first and second transparent electrode 51 and 57 provided on the transparent substrate 50a are electrically separated, and the second transparent electrode 57 is connected with the second electrode 56.

For example, $IrO_3+SnO_2$, $Ta_2O_5$, $WO_3$ and Al can be used as the first coloring layer 53, the electrolytic layer 54, the second coloring layer 55 and the second electrode 56.

Glass or hard plastics can be used for the transparent substrates 40a, 40b and 50b and ITO can be used as the transparent electrodes 41a, 41b, 51 and 57.

Figure 4:
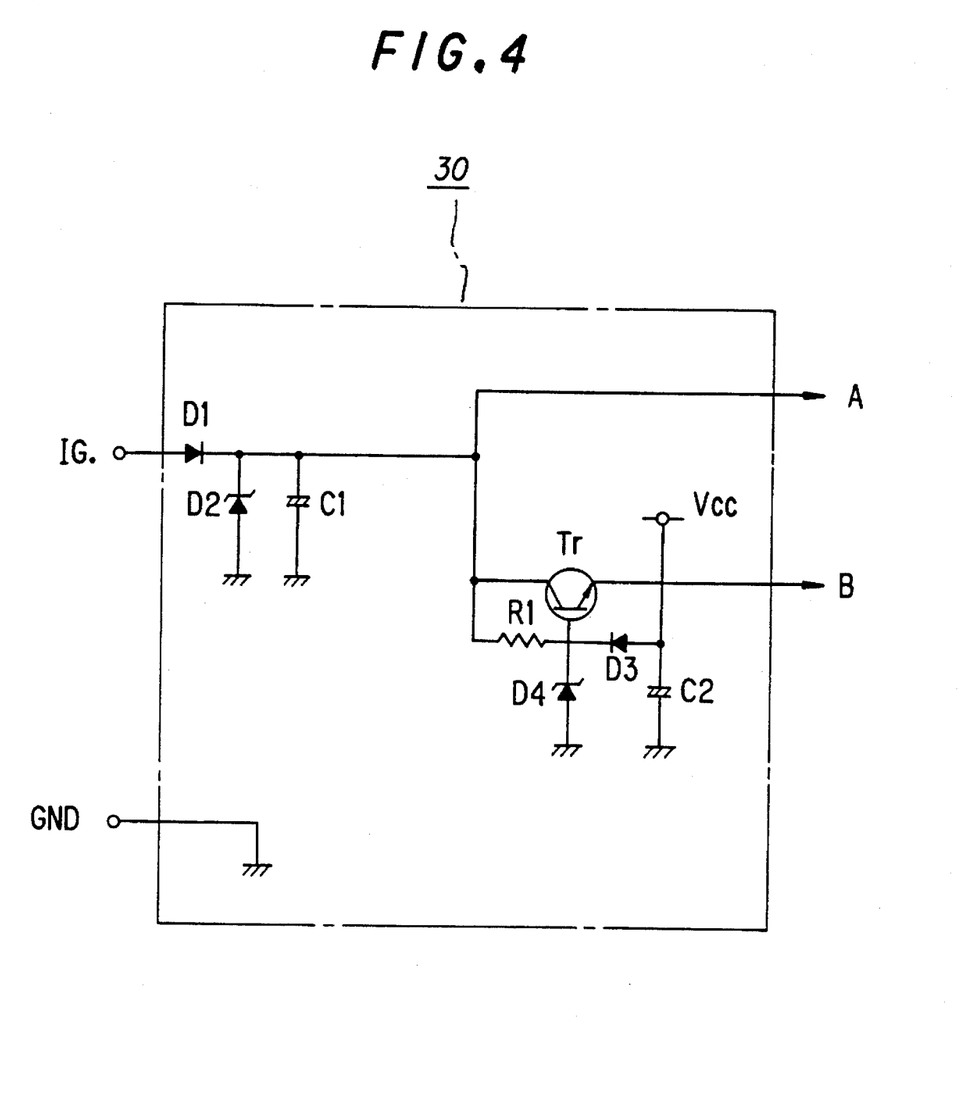
FIG. 4 is a circuit diagram of a stabilized power supply circuit used in the mirror system shown in FIG. 2.
Figure 5:
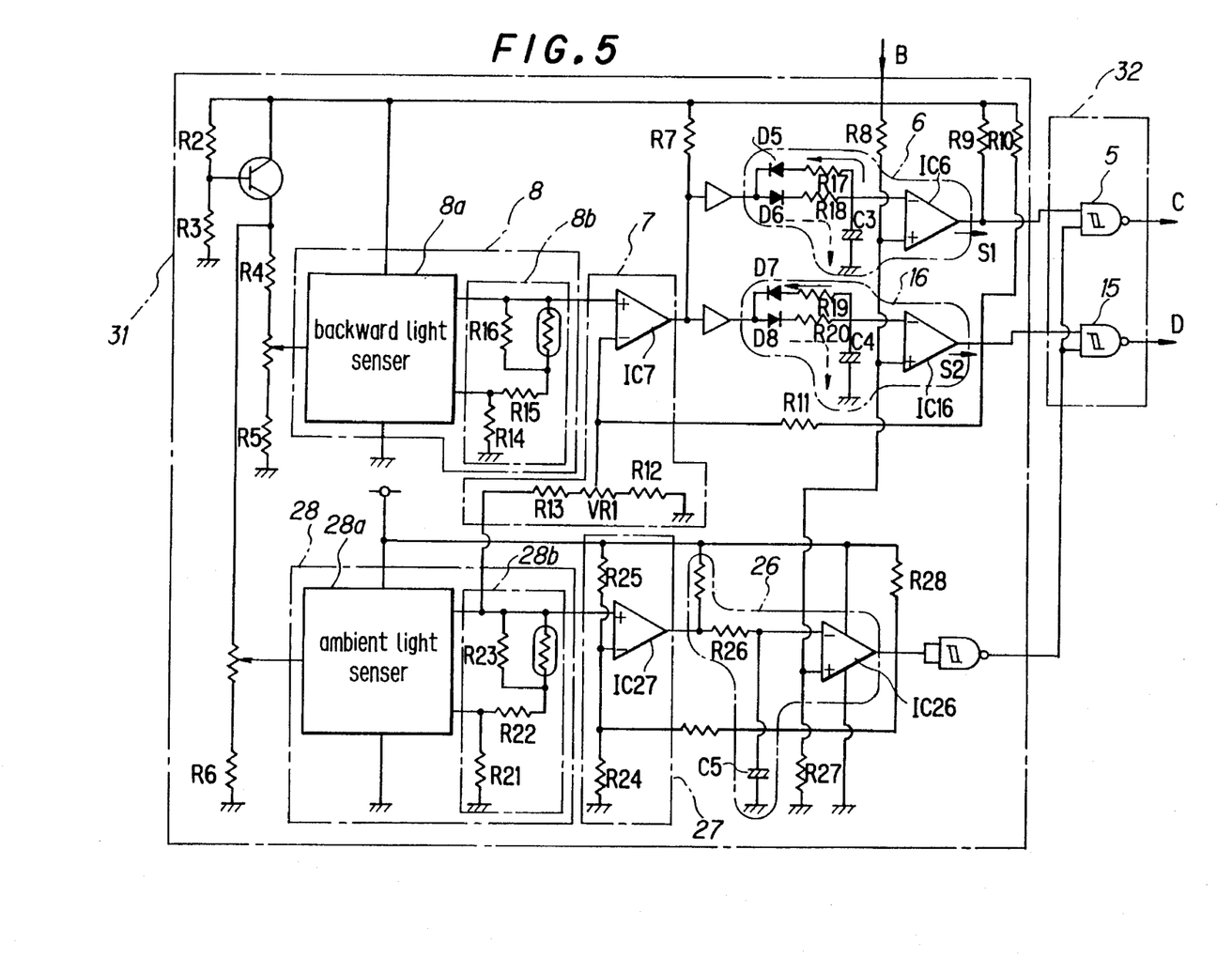
FIG. 5 is a circuit diagram of a sensing circuit used in the mirror system shown in FIG. 2.
Figure 6:
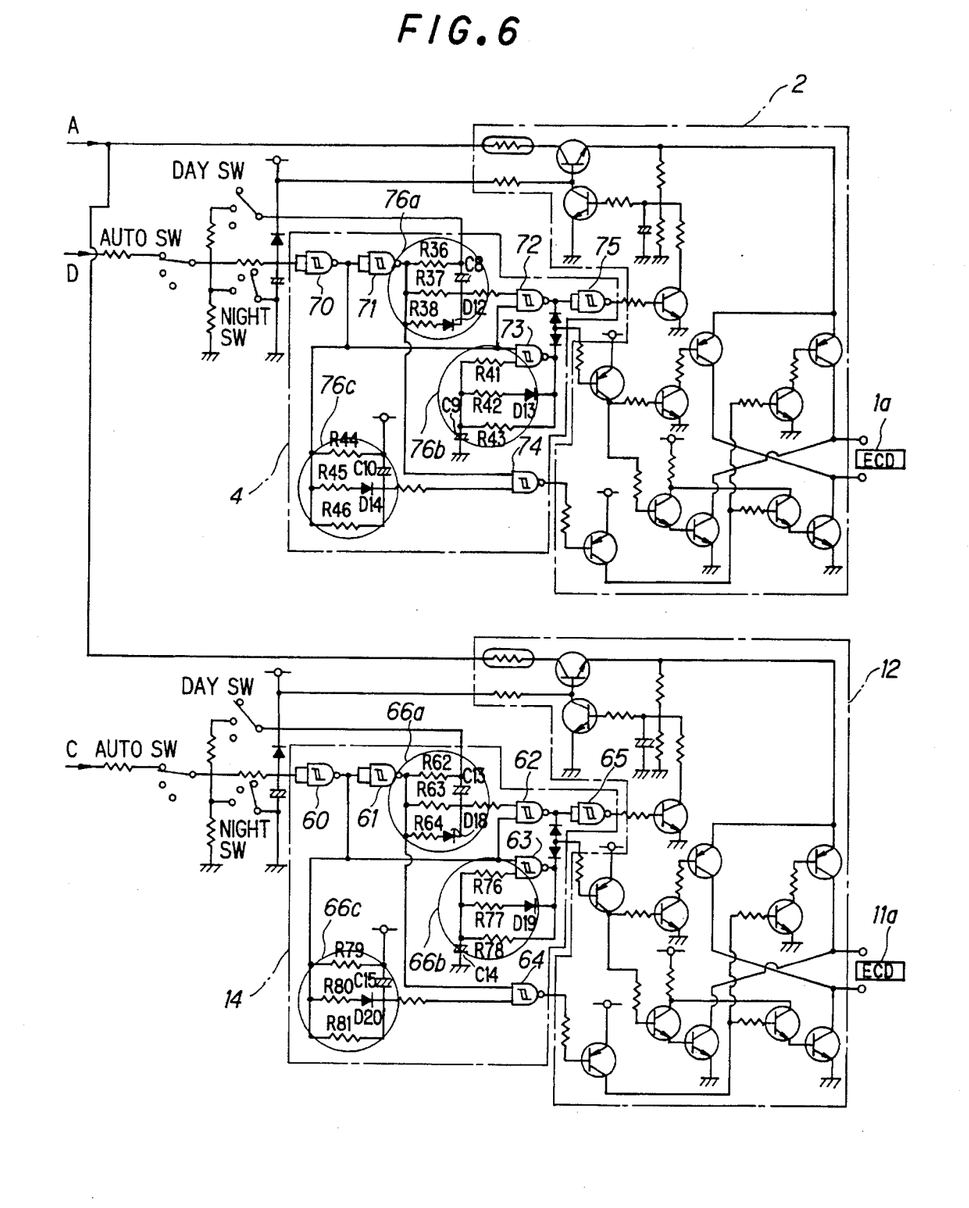
FIG. 6 is a circuit diagram of a drive circuit used in the mirror system of FIG. 2.

FIGS. 4 to 6 are circuit diagrams which illustrate the circuits shown as blocks in the block diagram of FIG. 2 in more detail. FIG. 4 shows the stabilized power supply circuit 30. FIG. 5 shows the sensing circuit 31 and the day/night mode switching gate circuit 32. FIG. 6 shows the driver circuit 33.

The stabilized power supply circuit 30 in FIG. 4 stabilizes the power supplied from the car battery and other devices and supplies it to the anti-glare mirror system. The supply voltage is provided on lines A' and B', with the supply voltage value set lower on line B' than on line A'. The set value is determined by the resistor R1 and the Zener diode D4.

In FIG. 5, the backward light sensor circuit 8 has a backward light sensor 8a and a sensor circuit 8b, and the ambient light sensor circuit 28 has an ambient light sensor 28a and a sensor circuit 28b.

To the "+ terminal" of op-amp IC7 in the day/night mode deciding circuit 7, is input the output from the sensor circuit 8b, and to "the − terminal" thereof, is input the output from the sensor circuit 28b after it is divided by the resistor R12, the resistor 13 and variable resistor VR1.

The op-amp IC7 compares these inputs and produces "the coloring signal" or "bleaching signal" which is fed to the IM delay circuit 16 and OM delay circuit 6.

The output signal from the sensor circuit 28b decreases as the surroundings of the mirror system becomes brighter. In the "daytime mode", the output is at a low level, while in the "nighttime mode", it is at a high level. The boundary between the "daytime mode" and the "night-time mode" can be set so that, when the ambient brightness is, for instance, below 0.6 Lux, the "nighttime mode" is actuated, while, when it is above 0.6 Lux, the "daytime mode" is actuated.

When the backward light from the headlights of the following car and other sources reaches the backward light sensor of the backward light sensor circuit 8 provided near IM 11, the output voltage from the sensor circuit 8b lowers. Accordingly, the signal output from the sensor circuit 28b and the one from the sensor circuit 8b are reversed in their amplitude relation. This reversed state means a glare condition is detected, and the coloring signal "L" is output from the op-amp IC7. If there is no incidence of backward light, the output from the op-amp IC7 becomes "H" so that the bleaching signal is produced.

The IM delay circuit 16 comprises a charge/discharge circuit having a condenser C4 and resistors R19 and R20, while the OM delay circuit 6 comprises a charge/discharge ciruit with a condenser C3 and resistors R17 and R18. The outputs from these charge/discharge circuits are input to "the − terminals" of op-amps IC16 and IC6 respectively, and the voltage divided by the resistors R8 and R27 is input to "the + terminals" of the op-amps IC6 and IC16 respectively. "The coloring signal" or "the bleaching signal" output from the day/night mode deciding circuit 7 is input to the the charge/ discharge circuits. The op-amp IC6 and IC16 change their output contents according to the amplitude of "the − terminal" and "the + terminal".

So, if "the coloring signal" or "the bleaching signal" changes, electric charges enter and exit from the condensers C3 and C4 of the charge/discharge circuit, so "the + terminals" of the op-amps IC6 and IC16 change in voltage. The condenser's charge/discharge time constant T is T=k X X c (constant), and a certain time is required for the amplitude relation between "the − terminal" and "the + terminal" of the op-amps IC6 and IC16 to be reversed. That is the outputs from the op-amps IC6 and IC16 does not change in their contents even if the signal output from the day/night mode deciding circuit 7 changes unless this changed signal persists for a certain time period.

In the second embodiment, resistor R8 has a resistance equal to that of resistor R27=10 kΩ, resistor R17 has a resistance of 310 kΩ, resistor 19 has a resistance of 82 kΩ, resistor R18 has a resistance 1MΩ, resistor R20 has a resistance of 620 kΩ, and the capacitance of condenser C3=the capacitance of condenser C4=4.7 µF. Because of the selection of these values, the charge/discharge time for coloring or darkening is 1 second and for bleaching is 2 seconds at the OM delay circuit 6, while 0.26 seconds for coloring and 2 seconds for bleaching at the IM delay circuit. These values can be varied according to need.

The day/night mode deciding circuit 27 includes the op-amp IC27. "The + terminal" of op-amp IC27 is fed the output from the sensor circuit 28b, and a fixed standard value is input to "the − terminal". The sensor circuit 28b has the characteristic that the output voltage decreases when the ambient light increases in brightness.

Since the voltage input to "the + terminal" of op-amp IC27 changes according to the ambient brightness, the choice between the "daytime mode" or "the nighttime mode" is made by comparison between the input voltages to "the + terminal" and "the − terminal". This output from the IC27 is input to the day/night mode deciding delay circuit 26 and input to the charge/discharge circuit made of resistor R26 and condenser C5.

Accordingly, the output from the op-amp IC26 does not change if the signal from the day/night mode deciding circuit 27 persists for a time period longer than the charge/ discharge time determined by the resistor R26 and condenser C5. The signals from the OM delay circuit 6, the IM delay circuit 16 and the day/night mode deciding delay circuit 26 to the coloring/bleaching switching gate circuit 32 and the logical decision is made by the IM gate circuit 15 and OM gate circuit 5.

In FIG. 6, the driver circuit 33 is provided with a select switch for the 6 circuits/3 contact points of the manual AUTO mode, DAY mode and NIGHT mode. If AUTO mode is selected, the anti-glare mirror system automatically decides if "glare conditions" or "inactivating conditions" are present and makes the IM 11 and OM 1 "colored" or "bleached" state. If DAY or NIGHT mode is selected, the IM 11 and OM 1 are always kept at "colored" or "bleached" state.

The following explains the operation of the apparatus when AUTO mode is selected.

The IM drive timer circuit 14 comprises inverters 60, 61 and 65, a timer 66a for coloring or darkening, the pulse oscillation circuit 66b for maintaining the colored state, a timer 66c for bleaching and the output gates 62, 63 and 64 of the timer for bleaching 66c.

The OM drive timer circuit 4, like the IM drive timer circuit 14, comprises the inverters 70, 71 and 75, the timer 76a for coloring, the pulse oscillation circuit 76b for maintaining the colored state, a timer 76c for bleaching and the output gates 72, 73 and 74 of the timer 76c for bleaching.

Explanation is hereinafter limited to the operation of IM drive timer circuit 14 and IM driving voltage control circuit 12, since OM and IM drive timer circuits 4 and 14, and also OM and IM drive voltage control circuits 2 and 12 operate in basically the same way.

When the input signal to the IM drive timer circuit 14 becomes "L", ECD of IM 11 is colored, while it becomes "H", ECD of IM 11 is bleached.

That is, when the input signal to the inverter 60 becomes "L", the output gate 62 of the coloring timer 66a outputs the coloring pulse with a 7-sec pulse width to the IM drive voltage control circuit 12, which applies 1.35 V drive voltage to ECD 11a via the coloring side transistors for 7 consecutive seconds to color ECD 11a.

The color maintaining pulse oscillation circuit 66b is actuated when the input signal becomes "L", and outputs the pulse with a 0.5-sec width and a 1.2 V voltage to the IM drive voltage control circuit 12, for instance, every 5 seconds.

Because of this, the color maintaining pulse is output every 5 seconds following the coloring pulse output from the coloring timer 66a to maintain the colored state of ECD 11a.

Meanwhile, when the input signal from the inverter 60 becomes "H", the output gate 64 of the bleaching timer 66c outputs the bleaching pulse with a 7-sec pulse width to the IM drive voltage control circuit 12. Because of this, the drive voltage (−1.2 V) with the polarity opposite to that of the drive voltage for coloring is applied to ECD 11a to bleach it.

Figure 7:
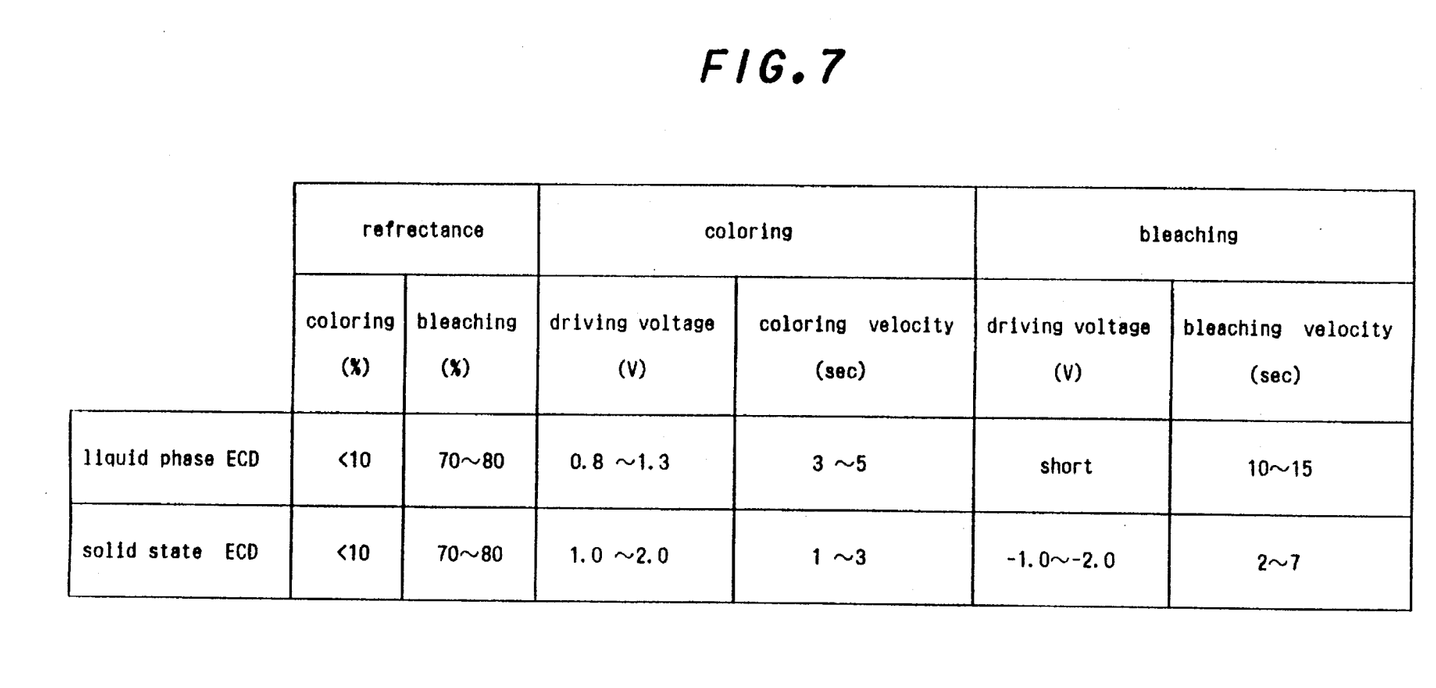
FIG. 7 is a table showing the results obtained when the anti-glare mirror system shown in FIG. 2 is operated.

FIG. 7 shows the results for the drive voltage as well as the coloring and bleaching speeds obtained with the above-mentioned circuit structure, when the reflectivity of IM 11 and OM 1 is set at 70–80% at the bleaching time, and below 10% at the coloring time.

By the way, the first embodiment uses two of the same type of ECDs, while the second embodiment uses two different types of ECDs. But according to this invention, the electro-optical device is not limited to these ECDs, but a guest/host (GH) type liquid-phase device may be used.

The guest/host type liquid-phase device has a mixture of pigment molecules dissolved in a nematic liquid crystal solvent. The orientation of pigment molecules changes according to the orientation of the liquid molecules to modulate the absorption of incident light and the reflective light.

It is therefore possible to make the IM 11 have a lower reactivity than the OM 1 by making the light absorption coefficient of the pigment molecule of OM 1 smaller than that of IM 11.

Also, ECD may be used for OM 1, and LCD including GH type liquid crystal device, for IM 11. Better in response compared with ECD, LCD is particularly effective in shifting the mirror system from inactive state to the anti-glare state by using a LCD for IM 11.

Since ECD continuously changes its reflectivity according to the changes in the drive voltage, it is possible to make the reflectivity of OM 1 in the anti-glare state greater than that of IM 11 by may be used for OM1. PLZT can continuously change the reflectivity, making the reflectivity of OM 1 in the anti-glare state greater than that of IM 11 by properly setting the drive voltage.

In the above embodiments, the electro-optical devices with different characteristics were used for IM 11 and OM1 to control their reflectivities.

However the drive voltages of IM 11 and OM 1 may be adjusted instead by adding a transforming circuit for changing the output voltage fed to the drive circuit 33 shown in FIG. 6.

Figure 8:
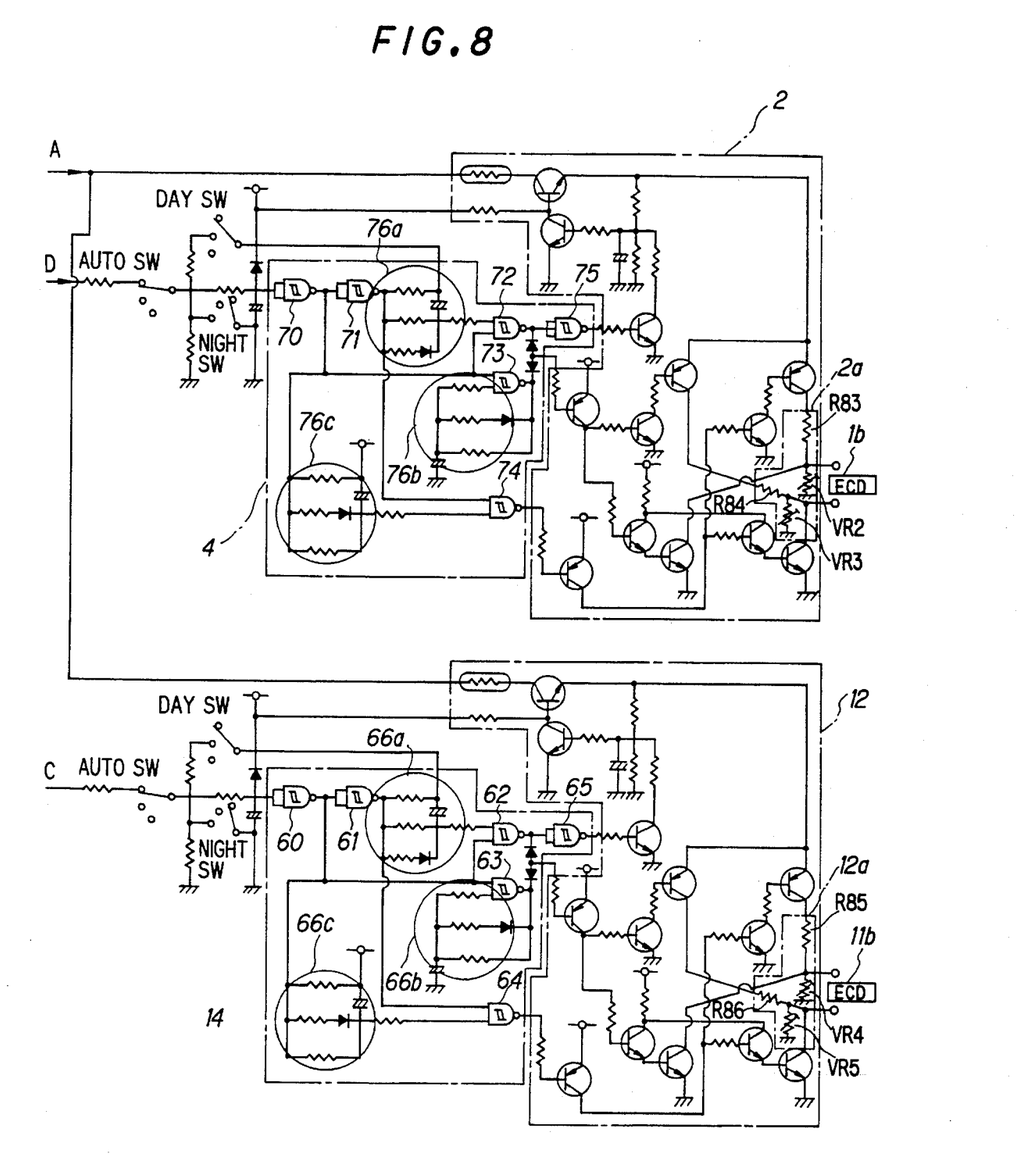
FIG. 8 is a circuit diagram of the drive circuit for an anti-glare mirror system of a third embodiment of the invention.

That is, the drive voltage can be divided via resistors by adding the conversion circuits 2a and 12a to the OM and IM drive voltage control circuits 2 and 12 respectively, as shown in FIG. 8.

This transforming circuit 2a consists of a pair of resistor R83 and variable resistor VR2, or resistor R84 and variable resistor VR3, and the transforming circuit 12a consists of a pair of resistor R85 and variable resistor VR4, or of resistor R86 and variable resistor VR5.

And the voltage supplied to the electro-optical devices 1b and 11b of OM 1 and IM 11 can be adjusted by adjusting the variable resistors VR2, VR3, VR4 and VR5.

As the electro-optical device, of course, the liquid-phase ECD may be used and the solid-state ECD for OM, as mentioned in the section of the second embodiment.

We claim:

1. An anti-glare mirror system for an automobile having an interior and an exterior, the system comprising:

an interior rearview mirror adapted to be arranged in the interior of the automobile;

an exterior rearview mirror adapted to be arranged in the exterior of the automobile, said interior rearview mirror and said exterior rearview mirror having different reflectivities of light;

an electro-optical device applied to said interior rearview mirror and having means for varying said reflectivity of said interior rearview mirror;

an electro-optical device applied to said exterior rearview mirror and having means for varying said reflectivity of said exterior rearview mirror;

electrical drive circuit means connected to said electro-optical devices to control said reflectivities of said exterior rearview mirror and said interior rearview mirror so that said reflectivities are adjustable to different reflectivity values;

sensing circuit means for detecting ambient and backward light and for comparing levels of said ambient and backward light with standard values to determine whether said levels of said ambient and said backward light warrant a change in said reflectivities of said interior and exterior rearview mirrors;

coloring/bleaching switching gate circuit means for determining if a time period during which said levels of said ambient and said backward light are at values which warrant a change in said reflectivities exceeds a predetermined time interval thus indicating that said values are not transient, said coloring/bleaching switching gate circuit means being connected with said electric drive circuit means and said sensing circuit means; and transforming circuit means for applying one drive voltage to said interior rearview mirror and another drive voltage to said exterior rearview mirror so that said one drive voltage applied to said interior rearview mirror is greater than said other drive voltage applied to said exterior rearview mirror so that said reflectivity of said interior rearview mirror is less than said reflectivity of said exterior rearview mirror.

2. An anti-glare mirror system as defined in claim 1, wherein said electro-optical devices include at least two members selected from the group consisting of electrochromic devices, liquid crystal devices and PLZT.

3. An anti-glare mirror system for an automobile having an interior and an exterior, the system comprising:

an interior rearview mirror adapted to be arranged in the interior of the automobile;

an exterior rearview mirror adapted to be arranged in the exterior of the automobile, said interior rearview mirror and said exterior rearview mirror having different reflectivities of light;

an electro-optical device applied to said interior rearview mirror and having means for varying said reflectivity of said interior rearview mirror;

an electro-optical device applied to said exterior rearview mirror and having means for varying said reflectivity of said exterior rearview mirror;

electrical drive circuit means connected to said electro-optical devices to control said reflectivities of said exterior rearview mirror and said interior rearview mirror so that said reflectivities are adjustable to different reflectivity values;

sensing circuit means for detecting ambient and backward light and for comparing levels of said ambient and backward light with standard values to determine whether said levels of said ambient and said backward light warrant a change in said reflectivities of said interior and exterior rearview mirrors;

coloring/bleaching switching gate circuit means for determining if a time period during which said levels of said ambient and said backward light are at values which warrant a change in said reflectivities exceeds a predetermined time interval thus indicating that said values are not transient, said coloring/bleaching switching gate circuit means being connected with said electric drive circuit means and said sensing circuit means, said electro-optical device applied to the interior rearview mirror being a liquid-phase electrochromic device, said electro-optical device applied to the exterior rearview mirror being a solid-state electrochromic device and said drive circuit means applying one drive voltage to said liquid-phase electrochromic device and another drive voltage to said solid-state electrochromic device so that said reflectivity of said interior rearview mirror is less than said reflectivity of said exterior rearview mirror, and said one drive voltage being equal to said other drive voltage.

4. An anti-glare mirror system for an automobile having an interior and an exterior, the system comprising an interior rearview mirror adapted to be arranged in the interior of the automobile;

an exterior rearview mirror adapted to be arranged in the exterior of the automobile, said interior rearview mirror and said exterior rearview mirror having different reflectivities of light;

an electro-optical device applied to said interior rearview mirror and having means for varying said reflectivity of said interior rearview mirror;

an electro-optical device applied to said exterior rearview mirror and having means for varying said reflectivity of said exterior rearview mirror;

electrical drive circuit means connected to said electro-optical devices and applying one drive voltage to said interior rearview mirror and another drive voltage to said exterior rearview mirror to control said reflectivities of said exterior rearview mirror and said interior rearview mirror so that said reflectivities are adjustable to different reflectivity values;

sensing circuit means for detecting ambient and backward light and for comparing levels of said ambient and backward light with standard values to determine whether said levels of said ambient and said backward light warrant a change in said reflectivities of said interior and exterior rearview mirrors;

coloring/bleaching switching gate circuit means for determining if a time period during which said levels of said ambient and said backward light are at values which warrant a change in said reflectivities exceeds a predetermined time interval thus indicating that said values are not transient, said coloring/bleaching switching gate circuit means being connected with said electric drive circuit means and said sensing circuit means, said drive circuit means being provided with timer circuit means to starts said one drive voltage fed to said interior rearview mirror prior to said other drive voltage fed to said exterior rearview mirror and to terminate said one drive voltage supplied to said interior rearview mirror later than said other drive voltage fed to said exterior rearview mirror.

5. An anti-glare mirror system for an automobile having an interior and an exterior, the system comprising an interior rearview mirror adapted to be arranged in the interior of the automobile;

an exterior rearview mirror adapted to be arranged in the exterior of the automobile, said interior rearview mirror and said exterior rearview mirror having different reflectivities of light;

an electro-optical device applied to said interior rearview mirror and having means for varying said reflectivity of said interior rearview mirror;

an electro-optical device applied to said exterior rearview mirror and having means for varying said reflectivity of said exterior rearview mirror;

electrical drive circuit means connected to said electro-optical devices and applying one drive voltage to said interior rearview mirror and another drive voltage to said exterior rearview mirror to control said reflectivities of said exterior rearview mirror and said interior rearview mirror so that said reflectivities are adjustable to different reflectivity values;

sensing circuit means for detecting ambient and backward light and for comparing levels of said ambient and backward light with standard values to determine whether said levels of said ambient and said backward light warrant a change in said reflectivities of said interior and exterior rearview mirrors;

coloring/bleaching switching gate circuit means for determining if a time period during which said levels of said ambient and said backward light are at values which warrant a change in said reflectivities exceeds a predetermined time interval thus indicating that said values are not transient, said coloring/bleaching switching gate circuit means being connected with said electric drive circuit means and said sensing circuit means, said interior and exterior rearview mirrors having terminals at which a terminal voltage is present, and said drive circuit means including terminal voltage sensing and controlling circuit means for detecting said terminal voltages, for comparing said terminal voltages with standard terminal voltage values and means for providing fixed values of said drive voltages at said interior and exterior rearview mirrors.

* * * * *